United States Patent
Beddus et al.

(10) Patent No.: US 11,595,408 B2
(45) Date of Patent: Feb. 28, 2023

(54) DENIAL OF SERVICE MITIGATION

(71) Applicant: BRITISH TELECOMMUNICATIONS PUBLIC LIMITED COMPANY, London (GB)

(72) Inventors: Simon Beddus, London (GB); Claudia Cristina, London (GB); Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 482 days.

(21) Appl. No.: 16/620,080

(22) PCT Filed: May 11, 2018

(86) PCT No.: PCT/EP2018/062272
§ 371 (c)(1),
(2) Date: Dec. 6, 2019

(87) PCT Pub. No.: WO2018/224242
PCT Pub. Date: Dec. 13, 2018

(65) Prior Publication Data
US 2020/0195665 A1    Jun. 18, 2020

(30) Foreign Application Priority Data

Jun. 8, 2017   (EP) .................................... 17175111

(51) Int. Cl.
*H04L 9/40* (2022.01)
*G06F 9/455* (2018.01)
(Continued)

(52) U.S. Cl.
CPC ...... *H04L 63/1416* (2013.01); *G06F 9/45558* (2013.01); *G06F 11/302* (2013.01);
(Continued)

(58) Field of Classification Search
CPC ........... H04L 63/1416; H04L 2463/141; H04L 63/1458; G06F 9/45558; G06F 11/302;
(Continued)

(56) References Cited

U.S. PATENT DOCUMENTS 7,640,591 B1   12/2009   Tripathi et al.
9,122,562 B1    9/2015   Stickle
(Continued)

FOREIGN PATENT DOCUMENTS

WO   WO-2015197564 A1 * 12/2015 ......... G06F 9/45533
WO        2018/224243       12/2018

OTHER PUBLICATIONS

U.S. Appl. No. 16/620,113 to Beddus, et al., filed Dec. 6, 2019 entitled "Containerised Programming" (15 pages).
(Continued)

*Primary Examiner* — Michael A Keller
(74) *Attorney, Agent, or Firm* — Nixon & Vanderhye P.C.

(57) ABSTRACT

A web server operating in a container has resource and network limits applied to add an extra layer of security to the web server. If a monitor detects that the container's resource usage is approaching one or more of these limits, which may be indicative of a DDoS attack, (step 210) or identifies traffic sources exhibiting suspicious behaviour, such as frequently repeated requests from the same address, or from a related set of addresses, a restrictor function caps the resources allowed by the original Webserver container to allow it to recover from buffer overflow and protect servers running in other containers from overwhelming any shared resources. A duplicator function starts up replica containers with the same resource limits to take overflow traffic, and a load balancing function then directs incoming traffic to these overflow containers etc. Traffic from suspicious sources is directed by the load balancer to one or more specially-
(Continued)

configured attack-assessment container(s) where a 'dummy' web server operates. The behaviour of these sources is analysed by a behaviour monitoring function over some time to determine if they are legitimate or malicious, which can control a firewall to block addresses identified as generating malicious traffic.

17 Claims, 4 Drawing Sheets

(51) Int. Cl.
    *G06F 11/30*     (2006.01)
    *G06F 11/34*     (2006.01)
    *G06Q 10/0631*     (2023.01)

(52) U.S. Cl.
    CPC .............. *G06F 11/3495* (2013.01); *G06F 2009/45587* (2013.01); *G06Q 10/06315* (2013.01)

(58) Field of Classification Search
    CPC ....... G06F 11/3495; G06F 2009/45587; G06F 2009/45562; G06F 8/60; G06F 9/5061; G06F 21/53; G06F 21/554; G06Q 10/06315
    See application file for complete search history.

(56) References Cited

U.S. PATENT DOCUMENTS

| | | | |
|---|---|---|---|
| 9,276,816 | B1 | 3/2016 | Conte et al. |
| 9,432,331 | B1 | 8/2016 | Shavell et al. |
| 10,298,577 | B1* | 5/2019 | Aithal ................. H04L 63/0884 |
| 2006/0236401 | A1 | 10/2006 | Fosdick |
| 2007/0214505 | A1 | 9/2007 | Stavrou et al. |
| 2009/0222880 | A1 | 9/2009 | Mayer et al. |
| 2014/0047439 | A1 | 2/2014 | Levy et al. |
| 2014/0122670 | A1 | 5/2014 | Levy et al. |
| 2015/0103113 | A1 | 4/2015 | Monclus et al. |
| 2016/0164911 | A1 | 6/2016 | Karasaridis |
| 2016/0283713 | A1 | 9/2016 | Brech et al. |
| 2017/0054759 | A1 | 2/2017 | Lee et al. |
| 2017/0111236 | A1* | 4/2017 | Bielenberg .............. H04L 67/36 |
| 2017/0126736 | A1 | 5/2017 | Urias et al. |
| 2018/0167487 | A1* | 6/2018 | Vyas ..................... G06F 9/5027 |
| 2019/0058722 | A1* | 2/2019 | Levin ..................... H04L 67/34 |

OTHER PUBLICATIONS

Exam Report dated Mar. 2, 2022 issued for European Application No. 18 722 082.7 (6 pages).
Van Rossem Steven, et al.: "NFV Service Dynamicity with a DevOps Approach: Insights from a Use-case Realization", 2017 IFIP/IEEE Symposium ON Integrated, Network and Service Management (IM), IFIP, May 8, 2017 (May 8, 2017), (6 pages).
Bill Karakostas: "Towards Autonomic Cloud Configuration and Deployment Environments", 2014 International Conference on Cloud and Autonomic Computing, Sep. 1, 2014 (Sep. 1, 2014), (4 pages).
Amith Raj MP, et al.: "Enhancing security of Docker using Linux Hardening Techniques", 2016 2$^{nd}$ International Conference on Applied and Theoretical Computing and Communication Technology (ICATCCT), IEEE, Jul. 21, 2016 (Jul. 21, 2016), (6 pages).
Combe Theo, et al.: "To Docker or Not to Docker: A Security Perspective", IEEE Cloud Computing, IEEE, USA, vol. 3, No. 5, Sep. 1, 2016 (Sep. 1, 2016) (9 pages).
Chelladhurai Jeeva, et al.: "Securing Docker Containers from Denial of Service (DoS) Attacks", 2016 IEEE International Conference on Services Computing (SCC), IEEE, Jun. 27, 2016 (Jun. 27, 2016), pp. 856-859, (4 pages).
Chelladhurai Jeeva et al: "Securing Docker Containers from Denial of Service (DoS) Attacks", 2016 IEEE International Conference on Services Computing (SCC), IEEE, Jun. 27, 2016 (Jun. 27, 2016), pp. 856-859, XP032953870.
Combe Theo et al: "To Docker or Not to Docker: A Security Perspective", IEEE Cloud Computing, IEEE, USA, vol. 3, No. 5, Sep. 1, 2016, pp. 54-62, XP011634100.
Amith Raj MP et al: "Enhancing security of Docker using Linux hardening techniques", 2016 2nd International Conference on Applied and Theoretical Computing and Communication Technology (ICATCCT), IEEE, Jul. 21, 2016, pp. 94-99, XP033089044.
Bill Karakostas: "Towards Autonomic Cloud Configuration and Deployment Environments", 2014 International Conference on Cloud and Autonomic Computing, Sep. 1, 2014 (Sep. 1, 2014 ), pp. 93-96, XP055395500.
N Van Rossem Steven et al: "NFV service dynamicity with a DevOps approach: Insights from a use-case realization", 2017 IFIP/IEEE Symposium on Integrated Network and Service Management (IM), IFIP, May 8, 2017, pp. 674-679, XP033127640.
Examination Report dated Dec. 16, 2021 issued in European Application No. 18 722 083.5 (8 pages).
Steven J. Vaughan-Nichols, "Containers v Virtual machines—How to tell which is the right choice for your enterprise", Apr. 28, 2015, 5 pages.
Extended European Search Report for EP Application No. 17175111.8 dated Nov. 23, 2017, 14 pages.
Search Report for GB Application No. 1709161.2 dated Nov. 13, 2017, 1 page.
International Search Report for PCT/EP2018/062272 dated Aug. 7, 2018, 5 pages.
Written Opinion of the ISA for PCT/EP2018/062272 dated Aug. 7, 2018, 6 pages.
Extended European Search Report for EP Application No. 17175106.8 dated Aug. 14, 2017, 10 pages.
Search Report for GB Application No. 1709133.1 dated Nov. 24, 2017, 1 page.
International Search Report for PCT/EP2018/062273 dated Aug. 23, 2018, 4 pages.
Written Opinion of the ISA for PCT/EP2018/062273 dated Aug. 23, 2018, 10 pages.
U.S. Appl. No. 16/620,113, filed Dec. 6, 2019, Containerised Programming.
European Examination report issued in EP Application No. 18722082.7, dated Dec. 22, 2020.

* cited by examiner

DENIAL OF SERVICE MITIGATION

This application is the U.S. national phase of International Application No. PCT/EP2018/062272 filed May 11, 2018 which designated the U.S. and claims priority to EP Patent Application No. 17175111.8 filed Jun. 8, 2017, the entire contents of each of which are hereby incorporated by reference.

BACKGROUND AND SUMMARY

This invention relates to the management of computer server systems, and in particular a method of controlling such a system in the face of a "Distributed Denial of Service" attack.

Distributed denial of service (DDoS) attacks are coordinated attacks on computer systems intended to prevent the use and availability of a service or network. Typical targets tend to be web servers. Such attacks occur by flooding the target server with network traffic at a much higher rate than the server is able to process it. The result is excessive buffering time, and DDoS attacks are therefore also known as buffer overflow attacks.

Such an attack can result in services becoming slow and unresponsive, and in many cases the buffering capacity of the system becomes full, so that further incoming network traffic cannot be buffered to await processing, resulting in suspension of the service. This can in turn result in loss or corruption of data, as a consequence of services suddenly stopping in the middle of a session. After such an attack, it can take a long time to restart services.

There exist several effective ways to detect DDoS attacks, but most mitigation processes rely on rate-limiting in which, when an attack is detected, the network traffic to the service under attack is reduced. However, such processes cannot distinguish between legitimate traffic and malicious traffic, and will cut both types off. Services could still suffer from the attack, for example through corruption of data if some, but not all, of a legitimate session is cut off.

The present invention uses "container" server architecture to mitigate a DDoS attack. Container technology allows multiple applications to run on a common operating system, but each operates inside its own isolated environment with only software components and libraries it requires, packaged in a standardised way. Using containers results in smaller applications, which are quicker to download, and use less of the system's resources. This approach means applications will be more efficient, lightweight and portable between different operating systems. Container technology is often compared to virtual machines (VM). Virtualisation enables multiple operating systems and applications to run on the same physical hardware. A hypervisor, an emulation of the actual physical hardware, allows slicing of compute, storage and network for each VM. However, each VM has a complete operating system which means it is large in size (Gigabytes), uses up many system resources and can take long to start-up.

It has been proposed to mitigate DDoS attacks in a virtual machine system by deploying duplicate virtual machines in a "deception network" to which rogue traffic can be redirected. US2017/126736 (Urias) describes such a system. However, virtual machines are complete operating systems on which applications are run, and they can take several minutes to start up, so it would not be possible to respond to an attack promptly unless one or more virtual machines were to be maintained on standby in readiness for such an eventuality. It is also difficult to differentiate which traffic is legitimate, so all traffic would be diverted to the deception network, which would compromise the operation of the system for legitimate users.

The usage of containerised applications requires no virtualisation of the hardware as they only abstract the operating system kernel. This makes containers more efficient, faster to implement and more portable than virtual machines.

The use of "Container" technology to run services and applications is becoming increasingly common due to its flexibility, packing density, portability across systems, and ease of deployment and configuration. However, there are known security flaws in containers. The present invention addresses these issues and results in a system architecture that can be used to significantly mitigate the impact of DDoS attacks, and improve service uptime in the event of such an attack.

A drawback of container technology is that containers are not completely isolated and secure when deployed. Container technologies such as "Docker" use kernel namespaces to provide a level of isolation, but they do not namespace all the resources. For example, the user namespace is disabled by default in container deployments which results in the container running the same namespace as its host. This leads to containers having full privileges when accessing the host's directories. When namespaces are enabled, containers run in their own namespace, rather than defaulting to that of the host, and are thus isolated from the host's namespace and so are not allowed to access important system directories.

Another security flaw in containers is the default ability to use all the resources of the host (such as memory and CPU). This is a problem because container applications run on the same kernel resources, so if an individual container consumes too much memory, as it would during a DDoS attack, it will starve any other applications running on the host.

A number of container monitoring tools exist that allow specification of monitoring configuration and provide alerting, such as Data Dog, Sysdig, Prometheus and Sensu.

Incoming and outgoing traffic can also be monitored for unusual traffic sources and requests. Tools for such monitoring include Andrisoft Wanguard, Rancher, NeuVector, Cloudify and FastNetMon, which provide traffic filtering and DDoS detection by monitoring the behaviour of applications running inside the containers, either to alert a human operator or to initiate a shut-down of affected services. These features can prevent network attacks such as DDoS and damage-limitation if attacks do happen, but they do not minimise service downtime if an attack does happen. The present invention uses inputs from such tools to take actions to mitigate the effects of DDoS attacks whilst avoiding service downtime by creating and running copies of the affected application inside containers.

Load balancing tools such as NGINX or F5 can be used to optimise the use of applications to maximise throughput and reduce latency. These tools operate by distributing network traffic requests amongst the new container application servers to ensure service uptime.

Kubernetes is a platform which allows the automatic deployment of applications in containers across groups of hosts, and has the ability to replicate container applications, to provide a backup in case the core container application fails. This feature is used to ensure up-time of containers during updating applications and when rolling back to earlier versions of applications.

According to a first aspect of the invention, there is provided a method of operating a computerised system in which a first containerised instantiation of an application is monitored for abnormal activity and, if such abnormal activity is detected, one or more duplicate containerised instantiations of the application are initialised, the duplicate containerised instantiations being isolated from, and running the same service as, the first containerised instantiations.

A second aspect provides apparatus for controlling a computerised server system, having a traffic monitor for detecting abnormal rates of activity in a first containerised instantiation of an application, and a duplicator, responsive to detection by the monitor of abnormal traffic, for generating duplicate containerised instantiations of the application isolated from, and running the same service as, the first containerised instantiation.

Network traffic may be directed to each instantiated container in accordance with its source network address. Such traffic may be analysed for patterns indicative of a suspected denial of service attack, and containers to which traffic is directed which have characteristics associated with such patterns can then have additional analysis functions added for assessing the suspected attack.

Resource usage limitations can be applied to each instantiation to cause network traffic to be directed to each of the containers in proportion to their respective limitations, which allows an initial resource usage limitation to be applied to the first instantiation, with further instantiations being initialised if traffic is detected in excess of the limitation.

The invention may be implemented on a computer system including a processor and memory storing computer program code for performing the steps of the process, and also extends to a computer program element comprising computer program code to, when loaded into a computer system and executed thereon, cause the computer to perform the steps of the invention.

The present invention uses container technology to reduce the impact of DDoS attacks. As fast instantiation is a feature of containers, the compromised services can be initialised inside one or more duplicate containers whilst network traffic is redirected appropriately during an attack on the main service, thereby reducing any service downtime.

Embodiments of the present invention react to resource usage information and network issues alerts to generate a new copy of the application and redirect network traffic accordingly, ensuring up-time of the container application in critical network attacks, such as DDoS.

With the input from network intrusion detection tools, suspicious packets and traffic sources can be grouped and segregated from legitimate traffic. Instead of cutting out traffic, new containers running the same service as the target are used to re-direct traffic from suspicious sources, and determine whether it is legitimate.

This invention also addresses security flaws found in some container technologies like Docker, by assessing the type of applications and applying appropriate resource usage limits and security measures.

The invention not only solves the problem of current DDoS mitigation solutions of rate limiting but also ensures services are accessible to users while the attack is being carried out and adds an extra layer of security missing from current container solutions.

This includes monitoring the usage of system resources, such as CPU and memory, for indications of a DDoS attack such as the use of large of amounts of resources to try to serve all the traffic requests. Monitoring usage is important when attempting to detect DDoS attacks because if a container is using considerably more resources than usual, it can be an indication that it is trying to serve the large amounts of requests coming from a possible attack. Individual server resources such as file systems can also be monitored for unusual patterns of use, as DDoS attackers may aim to target a specific part of the system on which the application is running by sending specific types of requests, for example requests targeted at privileged directories.

BRIEF DESCRIPTION OF THE DRAWINGS

An embodiment of the Invention will now be described, by way of example, with reference to the Figures, in which.

DETAILED DESCRIPTION OF PRESENT EXAMPLE EMBODIMENTS

This embodiment makes use of known monitoring techniques and standard Docker APIs, building wrappers around complicated features of standard Docker APIs. However, it will be understood that alternative implementations are also possible within the scope of the claims of this application. It is designed to act upon inputs from external resource usage technologies and network monitoring technologies. By adding extra configuration to containers at start-up it reduces the likelihood of DDoS attacks occurring.

The embodiment mitigates the impact of DDoS attacks by creating new containers on demand and using them to replicate services running in container applications which are suffering a DDoS attack, thus minimising service downtime. Load balancing capabilities are used for containers to optimise resource usage. Suspicious traffic sources (possible attackers) are identified by external network monitoring techniques, using this information to segregate suspicious network traffic from legitimate traffic and direct them to a replica of the attacked service to analyse its behaviour. This ensures legitimate traffic is not blocked from services.

Figure 1:
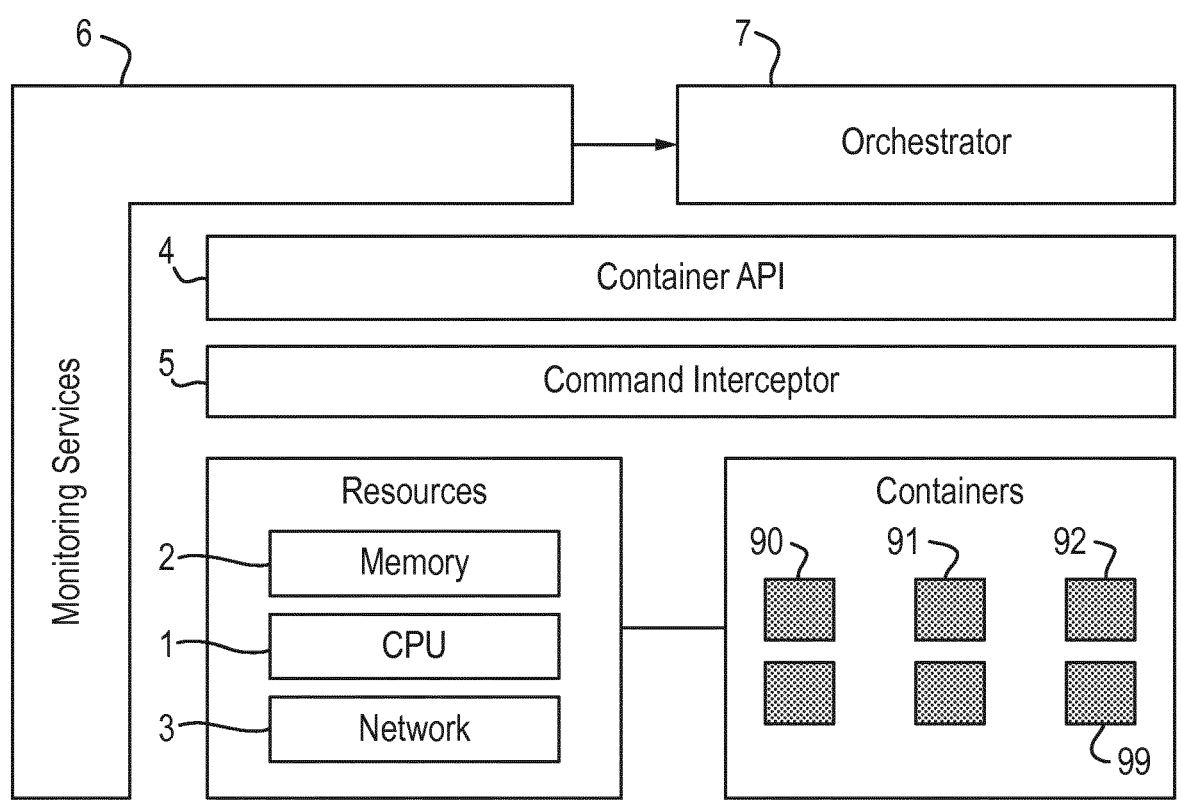
FIG. 1 depicts a high-level view architecture of the embodiment.

A high-level view architecture of the invention can be seen in FIG. 1. The system comprises the following principal components. Conventional resources are provided such as a central processing unit 1, memory 2 and network connection 3 A standard container technology Application programming interface (API) 4 is provided, to manage the creation and co-ordination of individual containers 90, 91, 92 etc.

A Command Interpreter/Interceptor 5 is provided to intercept user commands from the API 4 when individual containers 90, 91, 92... are created, to improve the security and isolation of the containers, by setting extra configuration parameters to the containers specification as will be discussed.

A service monitoring component 6 is responsible for monitoring the behaviour, usage and network traffic of running container applications and reporting unusual behaviour which may be a DDoS attack. An Orchestrator component 7 is responsive to inputs from the service monitor 6 to implement required precautions required to mitigate the impact of a DDoS attack on services using the container technology, by providing instructions to the API 4 to set up new containers and manage the operation of existing ones.

Figure 2:
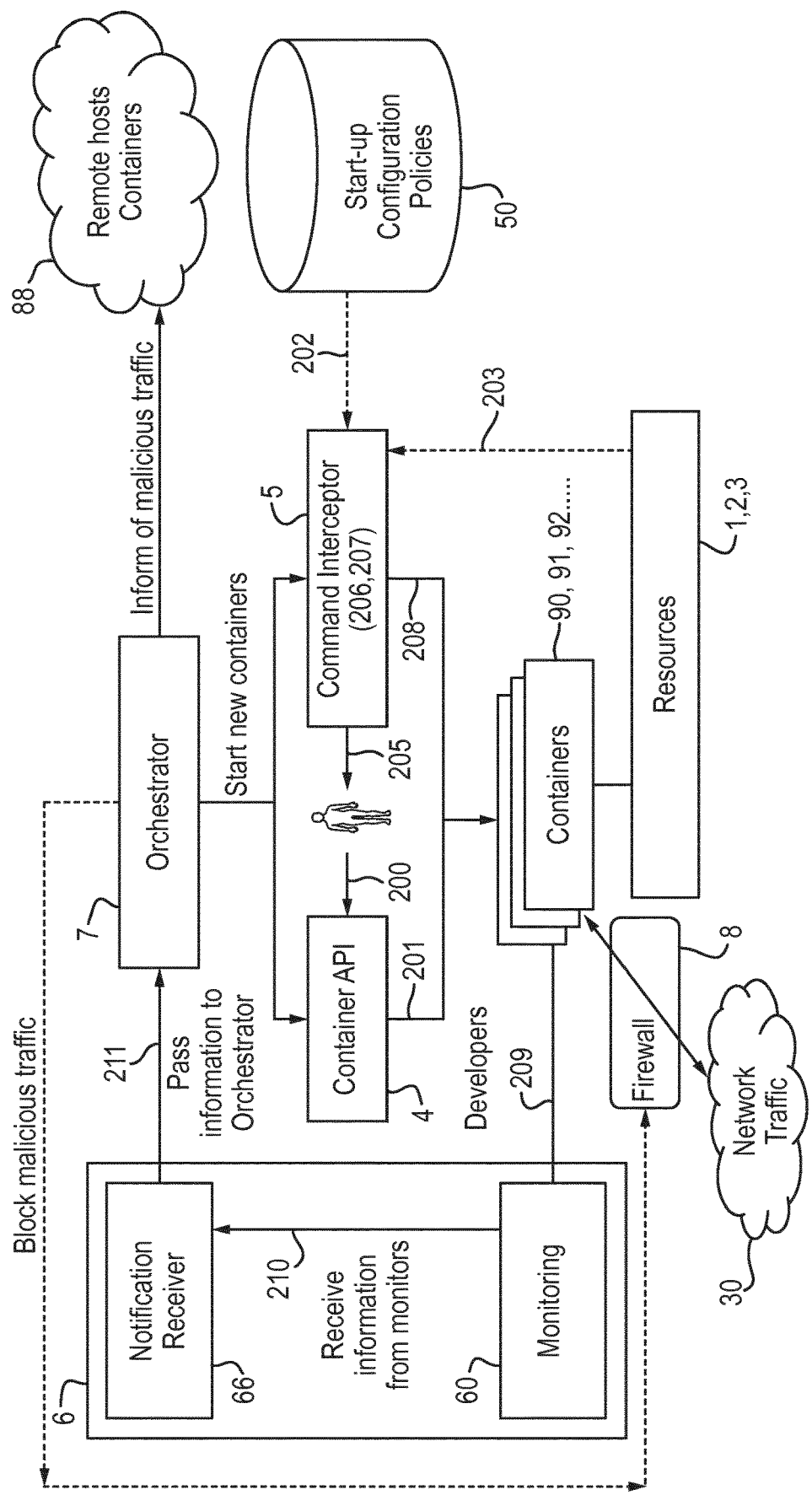
FIG. 2 depicts a high-level view of the flow of information and events through each of the components.
Figure 3:
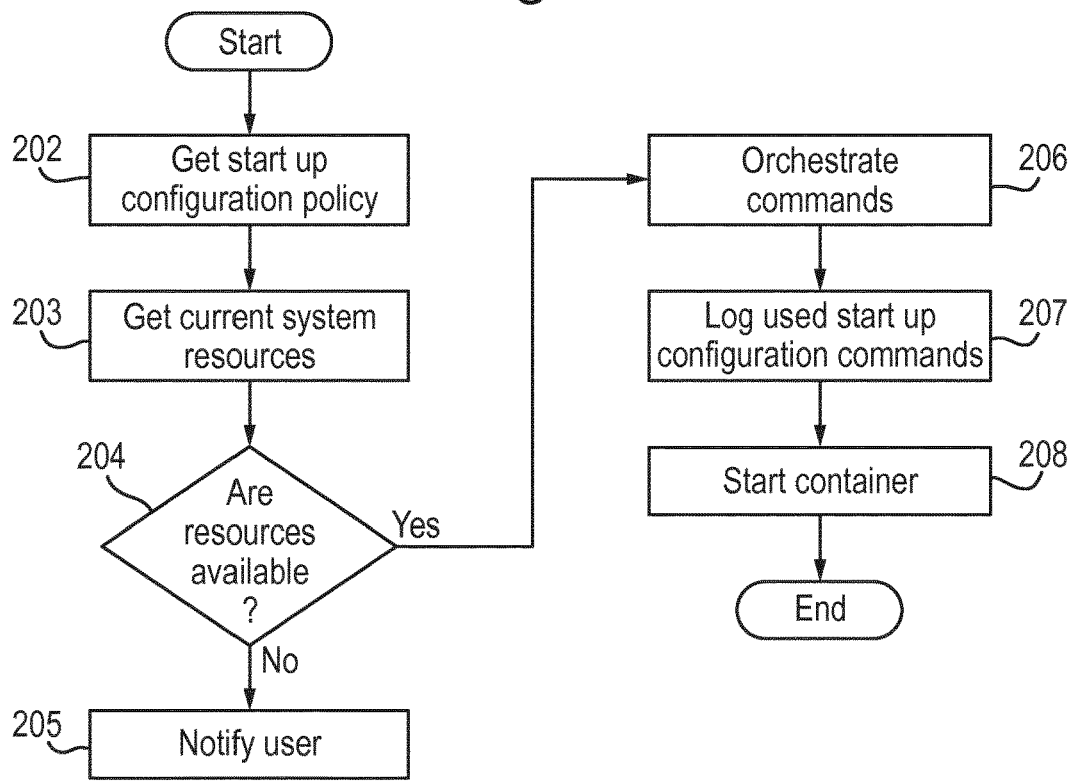
FIG. 3 depicts the flow of events when a container starts.

FIG. 2 shows a high-level view of the flow of information and events through the components depicted in FIG. 1. FIG. 3 shows in more detail the operation of the command interceptor 5 when a container starts.

The components, and the way they interact, will now be described in more detail with reference to FIGS. 2 and 3.

Initially, the system will be started up using the container provider's API 4 (step 200). For example, if using Docker, the command to start a new container would be: docker run --name container1 --i apache. This command sets up a new container 90 (step 201).

In this embodiment, when a container application 90 is launched by the API 4, the Command Interceptor 5 modifies these instructions (steps 202-207) by applying an extra layer of security, by enabling namespaces and setting resource limits. It can also be used to limit the network usage of a container.

The Command Interceptor 5 has access to a set of policies 50, (step 202) stored in the memory 2 or remotely, which list a set of default application types and the appropriate configuration to be applied. Before applying any configuration (step 203), it retrieves the appropriate policy for the type of application (step 202), and checks if the required resources (1, 2, 3) are available on the system. If the resources are not available, it will not start the application, and will advise what the user should do (step 205). These policies can be amended and added to by developers.

The command interceptor then co-ordinates the set-up commands (step 206), records the configuration (step 207) and starts operation of the new container 90 (step 208).

Services are then run on the container 90 corresponding with network traffic 30 through a firewall 8. Once installed, orchestration of the services can be done automatically in response to events, but developers may also interact with container applications if they wish through command line using the standard container API or, for commands specific to the embodiment, through the command interceptor 5.

The Monitoring Services component 6 of the architecture is broken down by its two main functions. It operates when an application is running to monitor the operation of that application (step 209) to identify episodes of high resource usage and possible DDoS attacks. Many resource monitoring functions can be used for the monitoring function 60 itself, such as DataDog, Prometheus, Sysdig Cloud or Sensu. Network monitoring applications available include FastNetMon and Andrisoft Wanguard. These applications form part of the Monitoring Services component. Unusual behaviour is notified to a notification receiver 66 operating as an interface between the monitoring applications 60 and the Orchestrator 7. It receives information from the monitors (step 210), and If unusual behaviour is detected it passes relevant information to the Orchestrator 7 (step 211).

Figure 4:
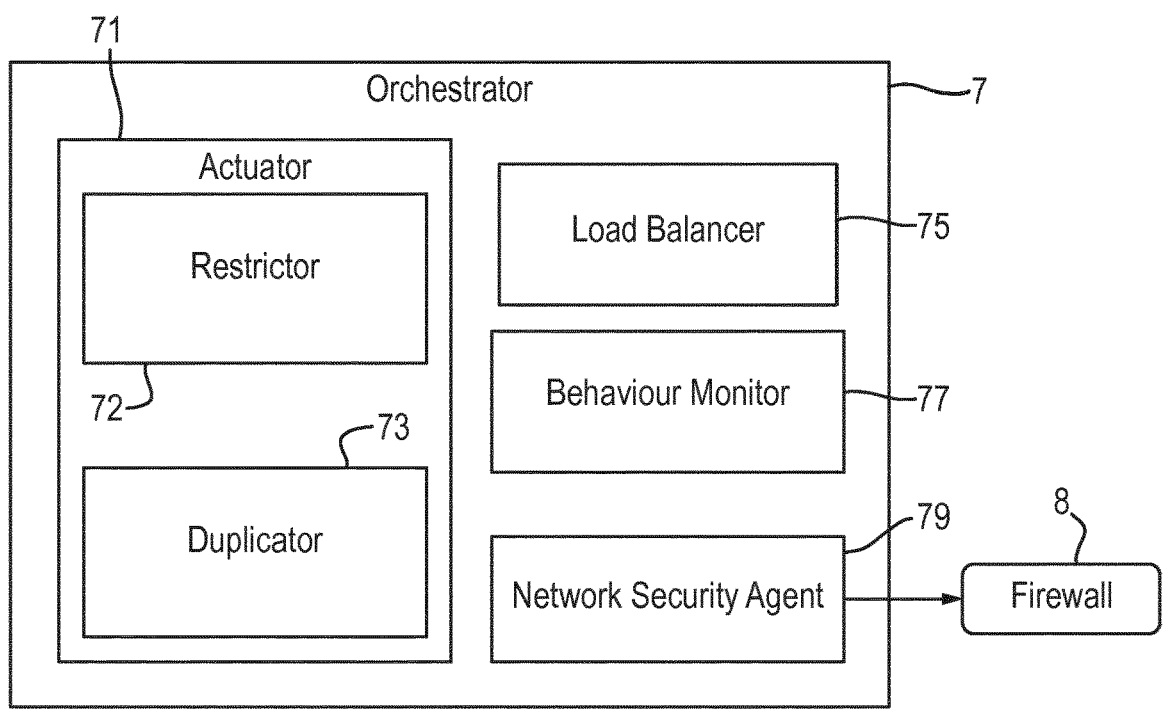
FIG. 4 depicts the components which form the orchestrator component of the architecture.

The components of the Orchestrator 7 are depicted in FIG. 4. It comprises four elements. An Actuator component 71 is responsible for two functions. A restrictor 72 restricts resources to the container application being attacked, which can be done using standard container technology API commands. A duplication function 73 initiates replicas 91, 92 of the attacked container application 90, which can be done using standard container technology API commands.

Performing such actions can require several commands. The Orchestrator may provide a wrapper around the required commands in order to simplify the action, should a manual intervention be required.

A Load Balancer 75 component is responsible for redirecting and balancing traffic to the containers 90, 91, 92 appropriately. The load balancer receives all HTTP requests and distributes them fairly to the containers. A suitable weighted load balancing configuration can be implemented using NGINX load balancing services.

By applying load balancing between multiple containers 90, 91, 92, the original container 90 can be relieved of processing requests, and the new containers can be given a higher weight which means they will process more requests. This will allow extra processing capabilty for the original container 90 to recover from the effects of the attack and reduce its buffer level.

In the configuration example below, original_containerApp represents the original container which was attacked. The containerApp2 and containerApp2 were created as a result of the attack and have been given a weight of 3 each. This means that while the original container will receive 1 request per cycle, the other 2 containers will receive 3 requests.

Weighted Configuration Example:

```
http {
    upstream myapp1 {
        server original_containerApp;
        server containerApp2 weight=3;
        server containerApp3 weight=3;
    }
    server {
        listen 80;
        location / {
            proxy_pass http://myapp1;
        }
    }
}
```

One or more of the replica containers 99 may be set up to use as a 'buffer' for suspicious traffic, using network monitoring tools to identify distrustful traffic sources. The load balancer 75 redirects such traffic to the selected containers 99 where its behaviour can be assessed.

A behaviour monitor component 77 is responsible for monitoring containers which are serving suspicious traffic sources, to observe and keep records of the types and frequency of incoming requests to determine if a source is legitimate. If a traffic source is identified as malicious, it passes a notification to a Network Security Agent 79

The Network Security Agent component 79 is itself a container, responsible for blocking identified malicious traffic sources from the network, and notifying containers running on other hosts but on the same network of malicious traffic sources.

The Network Security Agent 79 also provides outputs for the generation of a graphical view of Container status (e.g. healthy, attacked), and listing replicated containers started as a result of the DDoS attack and their purpose (e.g. whether to serve legitimate traffic or possible malicious traffic sources), listing traffic sources identified as possibly malicious and traffic sources which have been blocked, and listing remote hosts and containers warned of identified malicious traffic.

Figure 5:
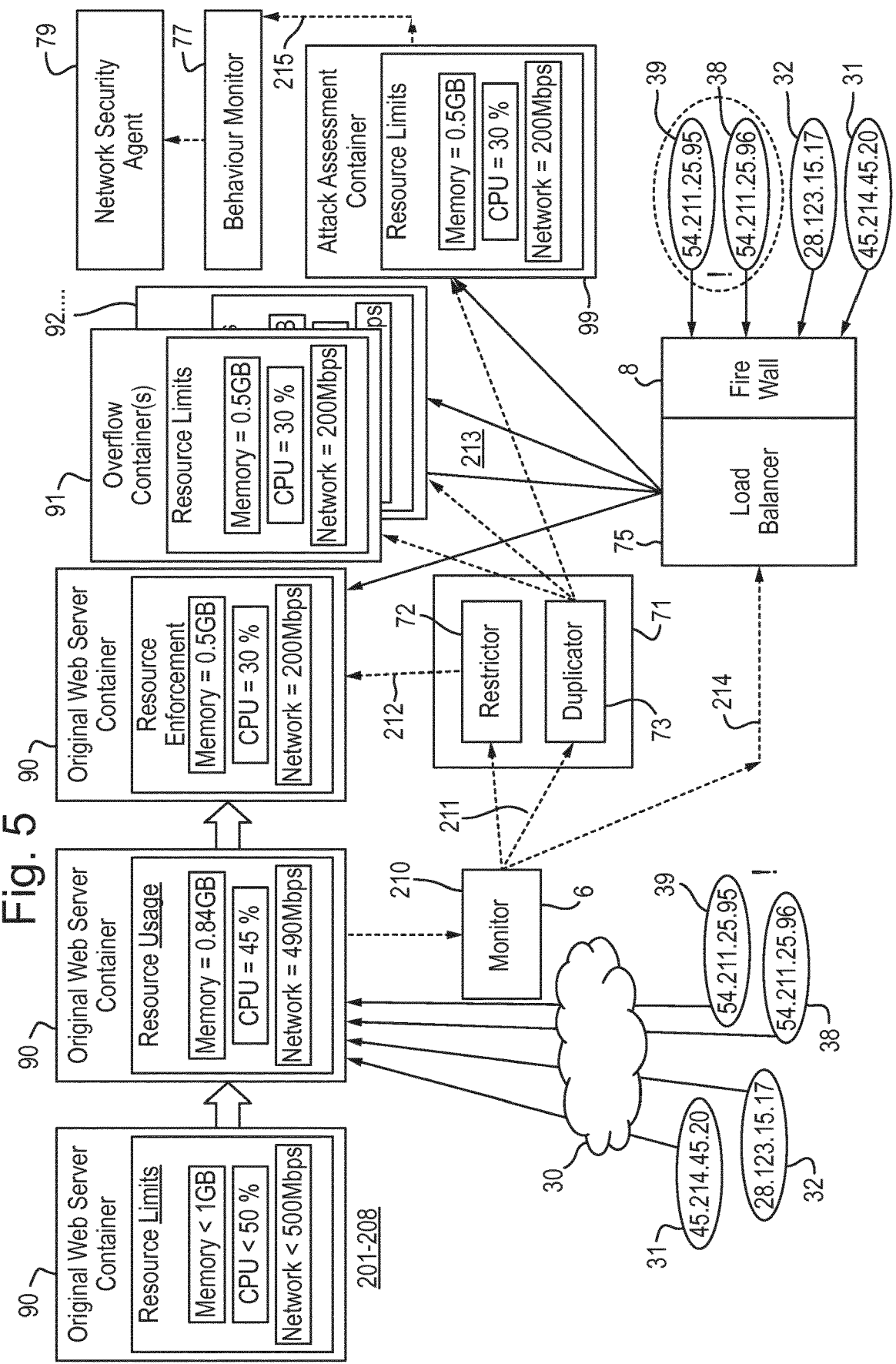
FIG. 5 is a graphical representation of a typical example of a DDoS attack and how the embodiment would react to it.

FIG. 5 is a graphical representation of the process by which the embodiment would respond to a DDoS attack.

Initially a web server is started in a container 90 is set up, as already described with reference to FIG. 2 (step 201) and has resource and network limits applied (step 208, see also FIG. 3) to add an extra layer of security to the web server. In the example shown in FIG. 5, limits of 1 GB memory, 50% CPU power and 500 Mbps are set.

If the monitoring services 6 detect that the container's resource usage is approaching one or more of these limits, which may be indicative of a DDoS attack, (step 210) the embodiment is configured to respond. In the example depicted in FIG. 5, the resource usage has reached 840 MB memory (84% of maximum), 45% CPU (90% of maximum) and 490 Mbps traffic (95% maximum). The monitoring system 6 also analyses traffic incoming from the network 30 and identifies any traffic sources 38, 39 exhibiting suspicious behaviour, such as frequently repeated requests from the same address, or from a related set of addresses.

The Monitoring services notification receiver 66 receives this information from the monitors 60 and notifies the orchestrator 7, (step 211).

The functional elements 71-79 of the orchestrator 7 then carry out a number of steps 212-215 to mitigate the effects of the attack.

The restrictor function 72 caps the resources allowed by the original Webserver container 90 (step 212) to allow it to recover from the buffer overflow and protect servers running in other containers from overwhelming any shared resources 1, 2, 3. In this example, memory capacity is reduced to 500 MB, CPU usage to 30%, and network traffic to 200 Mbps.

The duplicator function 73 starts up replicas 91, 92, . . . , 99 with the same resource limits (step 213). The load balancing function 75 then directs incoming traffic 31, 32, . . . , 38, 39 to the overflow containers 91, 92 etc.

The monitor 6 also reports suspicious traffic sources 38, 39 to the load balancer 75 (step 214). Traffic from such suspicious sources is directed by the load balancer 75 to one or more specially-configured attack-assessment container(s) 99 where a 'dummy' web server is now running. The behaviour of these sources is analysed by a behaviour monitoring function 77 over some time to determine if they are legitimate or malicious. (e.g. what type of requests are being submitted, and actions being performed by the application as a result. The results are reported to a network security agent container 79, which controls the firewall 8 to block addresses identified as generating malicious traffic. The orchestrator may also share data on such attacks with other systems operating on remote hosts 88.

Other traffic is directed to Webserver containers 91, 92 to relieve the pressure off the original webserver container 90 and ensure users can still access the service.

The invention claimed is:

1. A method of operating a computerised system in which a first containerised instantiation of an application is monitored for abnormal activity and, if such abnormal activity is detected, one or more duplicate containerised instantiations of the application are initialised, the duplicate containerised instantiations being isolated from, and running the same service as, the first containerised instantiation, in which traffic is directed to each containerised instantiation in accordance with its source network address and one or more of the containerised instantiations having additional functions for performing operations specific to the traffic originating from their allocated source network addresses.

2. The method according to claim 1, in which network traffic is analysed for patterns indicative of a suspected denial of service attack, and traffic having characteristics associated with such patterns is directed to a containerised instantiation of the application having an additional analysis function for assessing the suspected attack.

3. The method according to claim 1, wherein one or more containerised instantiations are configured to block identified malicious traffic sources from the network, and to notify other containers of the identified malicious traffic sources.

4. The method according to claim 1, in which resource usage limitations are applied to each containerised instantiation to cause network traffic to be directed to each of the containers in proportion to their respective limitations.

5. The method according to claim 4, wherein an initial resource usage limitation is applied to the first containerised instantiation, and further containerised instantiations are initialised if traffic is detected in excess of the limitation.

6. The method according to claim 1, further comprising:
creating one or more duplicate containerised instantiations having an additional analysis function for assessing a suspected denial of service attack;
identifying patterns indicative of a suspected denial of service attack; and
directing incoming data traffic having characteristics associated with such attacks to a containerised instantiation of the application having the additional analysis function.

7. The method according to claim 1, further comprising:
applying load balancing between the first containerised instantiation of the application and the one or more of the duplicate containerised instantiations of the application such that the one or more of the duplicate containerised instantiations of the application processes more of the traffic than the first containerised instantiation of the application.

8. The method according to claim 1, further comprising:
after the abnormal activity is detected, applying resource limits on resources provided by the first containerised instantiation of the application and applying the same resource limits on resources provided by the one or more duplicate containerised instantiations of the application.

9. Apparatus for controlling a computerised server system, having a traffic monitor for detecting abnormal rates of activity in a first containerised instantiation of an application, and a duplicator, responsive to detection by the monitor of abnormal traffic, for generating duplicate containerised instantiations of the application isolated from, and running the same service as, the first containerised instantiation, and in which traffic is directed to each containerised instantiation in accordance with its source network address, one or more of the containerised instantiations having additional functions for performing operations specific to the traffic originating from their allocated source network addresses.

10. The apparatus according to claim 9, wherein the duplicator is arranged to create one or more duplicate containerised instantiations having an additional analysis function for assessing a suspected denial of service attack, and the traffic monitor is configured to identify patterns indicative of a suspected denial of service attack, and the apparatus having a traffic direction system for directing incoming data traffic having characteristics associated with such attacks to a containerised instantiation of the application having the additional analysis function.

11. The apparatus according to claim 9, wherein the duplicator is arranged to generate one or more containerised instantiations configured to block identified malicious traffic sources from the network, and to notify other containers of the identified malicious traffic sources.

12. The apparatus according to claim 9, having a traffic restrictor for applying resource usage limitations to each containerised instantiation, to cause network traffic to be directed to each of the containers in proportion to its respective limitation.

13. The apparatus according to claim 12, wherein the traffic monitor reports an abnormal rate if it detects activity in the first containerised instantiation exceeding a first usage level.

14. The apparatus according to claim 9, wherein the apparatus is configured to apply load balancing between the first containerised instantiation of the application and the one or more of the duplicate containerised instantiations of the application such that the one or more of the duplicate containerised instantiations of the application processes more of the traffic than the first containerised instantiation of the application.

15. The apparatus according to claim 9, wherein the apparatus is configured to, after the abnormal activity is detected, apply resource limits on resources provided by the first containerised instantiation of the application and apply the same resource limits on resources provided by the one or more duplicate containerised instantiations of the application.

16. A computer system including a processor and memory storing computer program code which upon execution by the processor configures the computer system to:

operate a first containerised instantiation of an application;

monitor the first containerised instantiation of the application for abnormal activity;

upon detection of the abnormal activity, initialize one or more duplicate containerised instantiations of the application, the duplicate containerised instantiations being isolated from, and running the same service as, the first containerised instantiation; and direct traffic to each containerised instantiation in accordance with its source network address;

wherein one or more of the containerised instantiations has additional functions for performing operations specific to the traffic originating from their allocated source network addresses.

17. A non-transitory computer-readable storage medium storing computer program code to, when loaded into a computer system and executed thereon, cause the computer to perform the steps of the method claimed in claim 1.

* * * * *